(12) United States Patent
Sadowsky

(10) Patent No.: US 10,617,119 B1
(45) Date of Patent: Apr. 14, 2020

US010617119B1

(54) PISCICIDE COMPOSITION

(71) Applicant: MJSTI CORP., Overland Park, KS (US)

(72) Inventor: Maurice Sadowsky, Overland Park, KS (US)

(73) Assignee: MJSTI CORP., Overland Park, KS (US)

( * ) Notice: Subject to any disclaimer, the term of this patent is extended or adjusted under 35 U.S.C. 154(b) by 0 days.

(21) Appl. No.: 16/248,431

(22) Filed: Jan. 15, 2019

Related U.S. Application Data

(60) Provisional application No. 62/617,686, filed on Jan. 16, 2018.

(51) Int. Cl.
*A01N 59/16* (2006.01)
*A01N 25/32* (2006.01)
*A01N 25/22* (2006.01)
*A01N 59/20* (2006.01)

(52) U.S. Cl.
CPC .......... *A01N 25/32* (2013.01); *A01N 25/22* (2013.01); *A01N 59/20* (2013.01)

(58) Field of Classification Search
CPC ......... A01N 59/16; A01N 59/18; A01N 59/20
See application file for complete search history.

(56) References Cited

U.S. PATENT DOCUMENTS

| | | |
|---|---|---|
| 3,602,194 A | 8/1971 | Marking |
| 3,761,238 A | 9/1973 | Errede |
| 4,174,406 A | 11/1979 | Bordenca |
| 3,250,787 A | 4/1988 | Bloch et al. |
| 5,674,519 A | 10/1997 | Curtis et al. |
| 6,340,468 B1 | 1/2002 | Cutler et al. |
| 2003/0140863 A1 | 7/2003 | Aldrige |
| 2004/0244713 A1 | 12/2004 | Manzotti et al. |

FOREIGN PATENT DOCUMENTS

| | | |
|---|---|---|
| EP | 1479295 A1 | 11/2004 |
| WO | 2000069777 A1 | 11/2000 |

OTHER PUBLICATIONS http://pesticideinfo.org—Applicant Admitted Prior Art.
US EPA "Methods for Measuring the Acute Toxicity of Effluents and Receiving Waters to Freshwater and Marine Organisms", Fifth Edition, Oct. 2002.
Executive Order 13112 (EO 13112) dated Feb. 3, 1999.
Anjali G. Patel, et al. "Halting the Invasion: Maintaining the Health of the Great Lakes and Mississippi River Basin by Preventing Further Exchange of Aquatic Invasive Species", Environmental Practice 12 (4), Dec. 2010.
Asian Carp Control Strategy Framework, Jun. 2015, http://asiancap.us/documents/2015/Framework.pdf; updated most years.
Thomas E. Fingers, "Sorting Food from Stones: The Vagal Taste System in Goldfish, Carrassius Aruatus", Journal Comparative Physiology A Neurotheol Sens Neural Behavior Physiology, Feb. 2008, 194(2) pp. 135-143.
Anne Hansen et al., "Anatomical and Physiological Studies of Bighead Carps Demonstrate that the Epibranchial Organ Functions as a Pharyngeal Taste Organ", Journal of Experimental Biology Nov. 2014 , 217(21): 3945-3954.
G. De Boeck et al., "Sublethal Cooper Exposure Induces Respiratory Stress in Common and Gibel Carp but not Rain Bow Trout", Comparative Biochemistry and Physiology, Part C 144 (2007) 380-390.
Yen, K. Ip and Shit F. Chew, "Ammonia Production, Excretion, Toxicity, and Defense in Fish: A Review", Frontiers in Physiology, Oct. 2010, vol. 1, Article 134.
Stuart M. Levit, "A Literature Review of Effects of Ammonia on Fish" The Nature Conservancy, nature.org, Nov. 2010.
Pan, http://pesticideinfo.org/Detail_Chemical.jsp?Rec_Id=PC3354#Toxicity—Applicant Admitted Prior Art.

*Primary Examiner* — Kyle A Purdy
(74) *Attorney, Agent, or Firm* — Lathrop GPM LLP

(57) ABSTRACT

Embodiments of piscicide formulations are disclosed. A piscicide composition includes a first bead, comprising: about 0.5% to 75% by weight of a primary toxin; and an effective amount of a continuous phase to form the primary toxin into a toxin bead; and a second bead, comprising: about 1% to 85% by weight of a solubilizing agent; and an effective amount of a continuous phase to form the solubilizing agent into a solubilizing bead.

19 Claims, 2 Drawing Sheets

PISCICIDE COMPOSITION

CROSS-REFERENCE TO RELATED APPLICATIONS

This application claims priority to U.S. Provisional Patent Application No. 62/617,686, filed Jan. 16, 2018, the disclosure of which is incorporated herein by reference in its entirety.

FIELD OF THE INVENTION

This invention is directed to piscicides that are selective, environmentally safe and low cost.

SUMMARY OF THE INVENTION

The following presents a simplified summary of the invention in order to provide a basic understanding of some aspects of the invention. The summary is not an extensive overview of the invention. It is not intended to identify critical elements of the invention or to delineate the scope of the invention. Its sole purpose is to present some aspects of the invention in a simplified form as a prelude to the more detailed description that is presented elsewhere herein.

In one embodiment, a piscicide composition includes a first bead having about 0.5% to 75% by weight of a primary toxin and an effective amount of a continuous phase to coat the primary toxin, a second bead having about 1% to 85% by weight of a solubilizing agent and an effective amount of a continuous phase to coat the solubilizing agent.

According to one aspect of the invention, the toxin bead and the solubilizing bead are combined with a gelling agent to form a toxic formulation. The toxic formulation is subsequently formed into a pellet and cross-linked to form a toxic gelled pellet. In a further aspect of the invention, the gelling agent is one of sodium alginate and gelatin.

According to one aspect of the invention, the piscicide composition further includes an effective amount of a bait mixed into the formulation.

According to another aspect, the primary toxin is selected from the list consisting of: copper salts, zinc salts, lead salts, mercury salts, and chromium salts, and mixtures thereof. In one aspect, the primary toxin is a copper salt selected from the list consisting of basic copper carbonate and copper sulfate.

According to still another aspect of the invention, the solubilizing agent is selected from the list consisting of: a carboxylic acid, an amine, a strong acid, and an ammonium salt. In a further aspect, the solubilizing agent is a carboxylic acid. In still a further aspect, the solubilizing agent is acetic acid. According to yet another aspect, the solubilizing agent is lysine or glucono-delta-lactone. In one aspect, the solubilizing agent is an inorganic acid. In another aspect, the solubilizing agent is sodium hydrosulfite. According to still a further aspect of the invention, the solubilizing agent is an ammonium salt.

In another aspect, the continuous phase is a solid wax system selected from the list consisting of: fatty acids, natural waxes, natural esters, modified natural fats, mineral waxes, petrochemical waxes, and mixtures thereof. According to one aspect, the continuous phase is palmitic acid, stearic acid, beeswax, or mixtures thereof.

According to still another aspect of the invention, the first bead includes about 1 to 55% by weight basic copper carbonate as the primary toxin and the remainder palmitic acid as the continuous phase, and the second bead includes about 5 to 50% lysine as the solubilizing agent, and the remainder glycerol tristearate as the continuous phase. According to yet a further aspect, the first bead composition includes about 1 to 55% by weight basic copper carbonate as the primary toxin and the remainder palmitic acid as the continuous phase, and the second bead includes about 5 to 80% by weight glucono-delta-lactone and the remainder glycerol tristearate as the continuous phase.

According to another aspect of the invention, the first bead composition includes about 1 to 40% by weight copper sulfate as the primary toxin, and about 60 to 99% beeswax as the continuous phase.

According to still another aspect, the toxic gelled pellet is formed into a species dependent shape. In one aspect, the toxic gelled pellet has a particle size of about 1 cm by about 0.5 cm.

DETAILED DESCRIPTION

Figure 1:
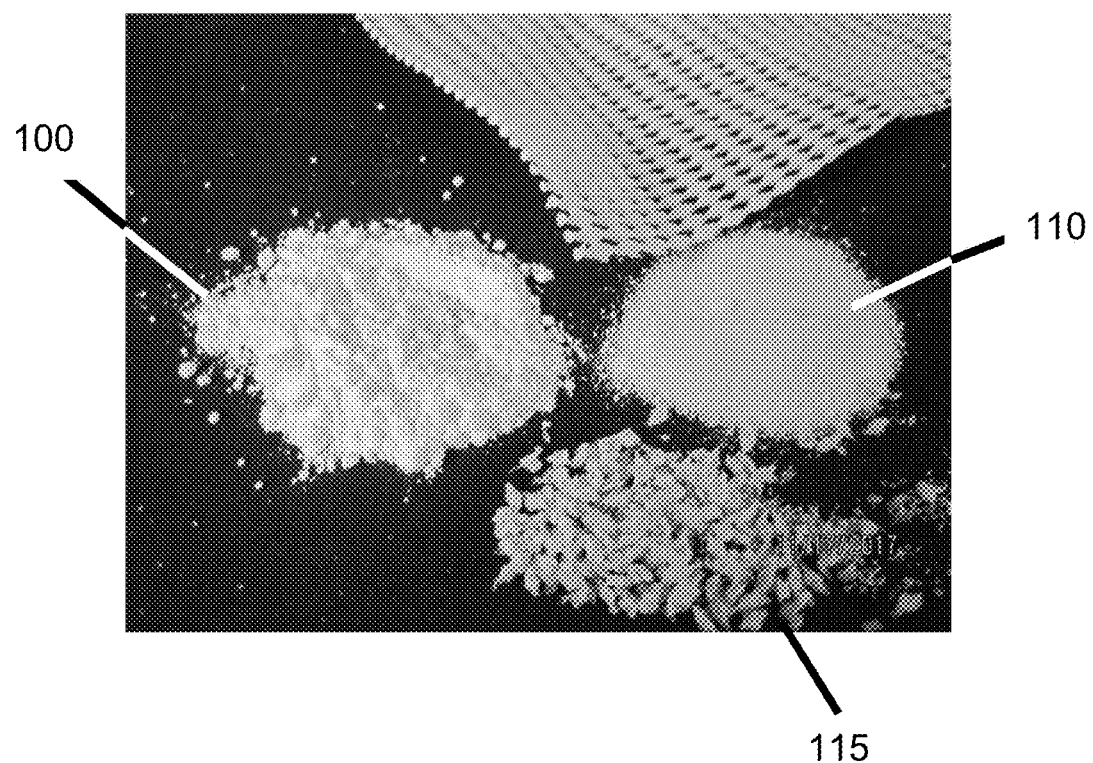
FIG. 1 is a photograph illustrating the process for forming toxic pellets according to an embodiment of the invention.
Figure 2:
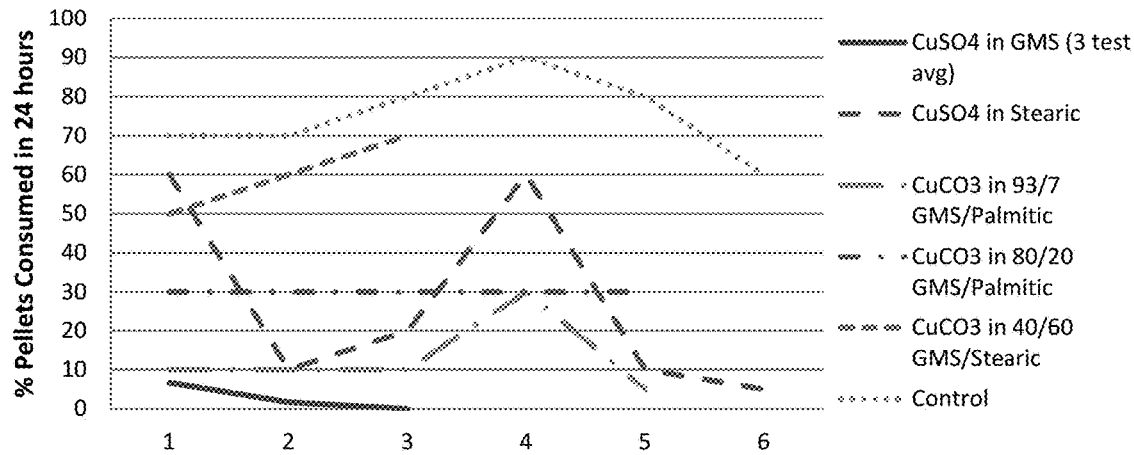
FIG. 2 is a chart showing estimated percentage of consumption (based on fecal material and number of unconsumed pellets) of various formulations of toxic pellets over 24 hours for several days according to an embodiment of the invention.
Figure 3:
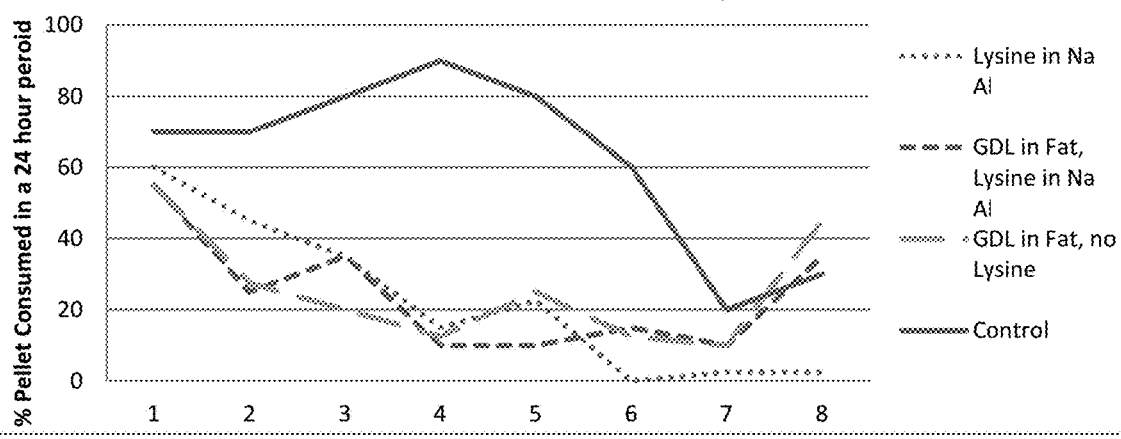
FIG. 3 is a chart showing consumption of various toxic formulations over time according to an embodiment of the invention.

The United States Geological Survey lists 451 nonindigenous freshwater fish that are established beyond their original United States habitat. Most of these fish are indigenous to the United States, although the fish habitats have increased as a result of man introducing the fish into non-natural habitats, e.g., by stocking bodies of water, building canals, or altering the environment. The rest of the listed fish are not native to United States. Some fish are "alien nuisance species," or fish "whose introduction does or is likely to cause economic or environmental harm or harm to human health" as defined by Executive Order 13112.

Cyprinidae are a family of non-functioning-stomach and toothless jawed fish that are native to Europe, Asia and North America. Large Eurasian cyprinidae, commonly called carp, are not native to North America. Carp are prolific, out compete North American native fish, change the plankton profile and disrupt the sediment. In the United States, the bighead (*Hypophthalmichthys nobilis*), silver (*Hypophthalmichthys molitrix*), grass (*Ctenopharyngodon idella*) and black (*Mylopharyngodon piceus*) carp are so damaging to United States aquatic environment that these four species are classified as alien nuisance species.

The US government outlined a multi-agency effort (the Asian Carp Framework Strategy) to preserve the US aquatic environment. The strategy consists of three parts, including population reduction. One of the goals for population reduction is a safe and selective pesticide. Additionally, since Asian carp infest almost the entire Mississippi Basin, the cost of the pesticide needs to be low cost.

Although the Asian carp are environmentally damaging, destruction of all aquatic species is not an acceptable solution. What is needed is a poison that is selective for the target species with limited, if any, effect on non-target species. An inhalation poison that works through the gills will affect most if not all aquatic species. However, it has been found that a digestion poison can be optimized for destruction of a target species.

Fish, including carp, have numerous mechanisms to ensure ingestion of safe food. Besides superior vision including infrared vision, a vibration detecting lateral line, and excellent hearing, fish have taste buds and chemical sensory cells all over their bodies, lips, mouth and even intestines. If a fish detects something in the water that is not desirable, the animal will swim away. Moreover, fish are uniquely able to handle digestive issues, and can adjust their physiology to environmental conditions and digestive by-products. For example, if a fish has indigestion, it can simply stop eating, as fish are cold blooded, and a healthy mature fish can fast for several weeks. A fish that has excess ammonia may hyperventilate to expel the biological waste. An imbalanced pH can be corrected by modifying the exhalation of carbon dioxide to rebalance the fish's internal pH.

Common carp (*Cyprinus carpio*) and goldfish (*Carrassuius aruatus* or *Carassius gibelio*; some debate on the classification) are known to put food in their mouth and swill it around before deciding to swallow. Common carp can sift out a worm from sediment, expelling the sediment through the gills and swallowing the worm. Bighead carp have an epibranchial organ that aggregates potential food gathered by the gill rakers, and have a high density of taste buds and chemosensory cells that may allow the fish to reject compacted food that contains toxins. Because of the sophisticated nature of a fish's food defensive mechanism, it has traditionally been difficult to develop toxins that will aid in the population reduction of unwanted fish populations.

Current EPA registered piscicides (a chemical substance poisonous to fish) include Rotenone, niclosamide and 3-Triflouoromethyl-4-nitrophenol. All four materials are hazardous and require an EPA red label due to the potential harmful effects on human health and the environment. While utilized as piscicides, the materials are not selective for fish and are toxic to other biological animal classes including mammals. Coating these piscicides to make them more species selective also increases the environmental half-life of the active ingredient. Toxaphene [chlorinated camphene] also has past usage as a piscicide but is no longer listed as a registered EPA pesticide. Toxaphene is toxic to fish at 5 to 35 ppb and takes at least seven months to decompose. On the Pesticide Action Network (PAN) Pesticide Database, Toxaphene is listed as highly toxic and a carcinogen.

Many ingredients are toxic to aquatic species. A search of the PAN, Pesticide Database shows 302 chemicals that have very highly acute toxicity to aquatic organisms, 278 chemicals that have high acute toxicity to aquatic organism, 391 chemicals that have moderate acute toxicity to aquatic organisms, and 365 chemicals that have slight acute toxicity to aquatic organisms. The standard testing protocols, including EPA aquatic protocols, do not determine the method of entering the animal. However, most if not all, of the toxicity is by inhalation and not by digestion. As mentioned above, chemicals that are toxic by inhalation are inherently not selective to a particular species, and can therefore cause an unintended reduction in population of certain aquatic species in addition to the intended reduction in population of certain alien nuisance species. A selective, safe and low cost piscicide configured to reduce the population of invasive fish is desirable.

A digestive poison can be configured to be selective to our target species based on their eating/digestive processes. However, such a poison must overcome the fish's digestive protections and rehabilitative processes. Since water systems support a number of biological classes of animals and plants, and are often used for recreation and potable water, the ideal pesticide formulation uses moderately toxic materials that will have minimal effect, if any, on non-targeted fish and other biological classes of animals and plants, and will decompose to safe levels of chemicals already found in the environment.

Embodiments of the invention are described with specificity herein to meet statutory requirements. However, the description is not intended to limit the scope of the patent. Rather, the invention may be embodied in other ways, and may include different steps or combinations of steps in conjunction with technologies currently employed or later developed.

Embodiments of piscicide formulations suitable for selective extermination of one or more target species of fish, while maintaining environmental standards, are described herein. The formulations exhibit improved selectivity, toxicity, and environmental affability over other formulations and methods commercially available for eliminating alien nuisance species of fish.

Definitions

Listed below are definitions of various terms used to describe the invention. The definitions apply to the terms as they are used throughout this specification and claims, unless otherwise limited in specific instances, either individually or as part of a larger group.

Unless defined otherwise, all technical and scientific terms used herein generally have the same meaning as commonly understood by one of ordinary skill in the art to which this invention belongs. Generally, the nomenclature used herein and the laboratory procedures are those well-known and commonly employed in the art.

As used herein, the articles "a" and "an" refer to one or to more than one (i.e. to at least one) of the grammatical object of the article. By way of example, "an element" means one element or more than one element. Furthermore, use of the term "including" as well as other forms, such as "include", "includes," and "included," is not limiting.

As used herein, the term "about" or "approximately" will be understood by persons of ordinary skill in the art and will vary to some extent on the context in which it is used. As used herein when referring to a measurable value such as an amount, a temporal duration, and the like, the term "about" is meant to encompass variations of ±0-20% from the specified value, as such variations are appropriate to perform the disclosed methods.

Descriptions of Various Embodiments of the Invention

According to one embodiment of the invention, a formulation for a piscicide includes a toxin, a solubilizing agent to facilitate absorption of the toxin, and a continuous phase (or binder) to render the toxins suitable for species consumption in an aqueous environment. Optionally, the formulation also includes an attractant or bait. The toxin is preferably, though not necessarily, substantially water insoluble. In one embodiment, the toxin is a metal salt. The metal compound can be, for example, mercury, lead, chromium, or any other metal that will damage the fish. In one embodiment, the toxin is copper sulfate. In another embodiment, the toxin is basic copper carbonate.

The continuous phase protects the primary toxin and prevents the fish from recognizing the toxin. In one embodiment, the continuous phase is a wax coating comprising a long chain fatty acid. As used herein, a long-chain fatty acid is a carboxylic acid with an aliphatic chain having 14 or more carbon atoms. In another embodiment, the wax coating may be a monoglyceride, triglyceride, mono/diglyceride, beeswax, carnauba wax, candelilla wax (a wax derived from the Candelilla shrub (*Euphorbia antisyphilitica*)), a petrochemical wax such as an alpha olefin wax, paraffin waxes, or microcrystalline waxes, or other wax. It shall be appreciated that any water-insoluble wax may be used so long as the wax masks the active material and allows for the release of the active ingredient(s) after fish digestion.

The solubilizing agent enhances the activity of the toxin inside the fish by increasing the toxin's solubility. The solubilizing agent may be a carboxylic acid, amine, or an ammonium salt. Other possible solubilizing agents may include inorganic acids such as hydrochloric acid, hydrobromic acid, hydroiodic acid, sulfuric acid, and the like. Some specific organic acids include lactic acid and aliphatic acids, such as acetic acid and myristic acid. In one embodiment, the solubilizing agent is sodium diacetate. Gluconates including glucono delta-lactone and ethylenediaminetetraacetic acid (EDTA) and/or their salts are also potential solubilizing agents. Ammonium chloride, sulfate and other salts will also solubilize insoluble copper compounds.

Some solubilizing agents may be multifunctional. For example, acetylsalicylic acid may solubilize the metal salt and cause other damage to the fish. Lysine attracts carp and can therefore act as a solubilizing agent as well as bait. In embodiments, the solubilizing agent is lysine or glucono-delta-lactone. The solubilizing agent may be wax coated.

An attractant may optionally be included in the formulation to invite the target fish to eat the formulation. The attractant may be included in the wax dispersion and/or physically mixed into the pesticide formulation in particulate form. Attractant examples for the bighead and silver carps include algae flour, grain flour, amino acids, and protein isolates from dairy or grain products. Other attractants may additionally, or alternately, be utilized based on the target species.

It has been shown that carp will consume and digest refined fats that are filled with non-food chemicals. Importantly, the non-food chemicals can be toxic to the fish. It was discovered that a combination of moderate aquatic toxins (as classified in the PAN Pesticide database) will kill fish when digested. More specifically, and as described in greater detail below, a combination of an organ damaging toxin and one or more solubilizing ingredients will cause carp to perish. Surprisingly, without the solubilizing agent, the carp do not die. Yet consumption of the synergetic agent alone is not toxic to the fish and is in many cases nutritious. It may also be possible to coat the toxin with water insoluble, non-polymorphic wax such as beeswax, as it has been shown that such a combination will also kill fish.

Importantly, fish must voluntarily consume the formulation and the toxin must be configured to release when it is too late for the fish to reject the pesticide. Although many delivery mechanisms may be appropriate, fish absorb toxins in their intestines. The toxin is then transported to the liver, and/or head kidney, and the organ cells grow in size and number before undergoing necrosis (cell death). The fish die without a functioning liver or head kidney. Excess toxin in the blood can also cause neural and other organ damage.

A wax coating may prevent the fish from sensing the toxin, yet release the toxin in the fish's intestines. Once a fish consumes a toxin-containing compound, the fish's overall consumption significantly declines, and by day four the consumption almost completely ends. The fish becomes emaciated. In the wild, an emaciated state will make the fish more susceptible to predators, diseases, and trauma.

In one method of forming the piscicide beads, the toxin is coated by spray congealing a ground metal salt with a molten wax. The amount of toxin in the wax may be limited by the willingness of the fish to consume the pellet. Other limiting factors are known in the art of spray congealing, and include settling of the toxin, surface area of the toxin, and the volume of the toxin. If the solubilizing agent is to be coated, it may be coated separately from the active toxin. However, the solubilizing agent may not be encapsulated, especially if the coated toxin beads are put in a water gel.

Other methods of forming the piscicide pellets may also be appropriate, including but not limited to fluid bed encapsulation, spray drying encapsulation, pan coating encapsulation, coacervation encapsulation, and the like.

To attract and make consumption desirable for the target specie, bait may be used. As is set forth in greater detail below in the experimental section, the bait composition may include pond food, corn meal, grass clippings or other green plants, algae, and other types of bait. In one embodiment, the bait is corn meal. In this instance, the corn meal will attract common carp while other fish that eat similar to common carp will not consume the pellet. According to another embodiment, the bait is pond food.

According to an embodiment of the invention, the formulation comprises a first bead comprising a primary toxin coated with a continuous phase (e.g., binder) and a second bead comprising a solubilizing agent optionally coated with a continuous phase. The first bead formulation includes about 0.5% to about 75% by weight of the primary toxin. In an embodiment, the formulation includes about 5% to about 50% by weight of the primary toxin. In still another embodiment, the primary toxin is about 5% to about 30% by weight of the total formulation. In a further embodiment, the primary toxin is about 10% by weight of the total formulation.

The primary toxin may be a copper salt, zinc salt, lead salt, mercury salt, chromium salt, and/or combinations thereof. Other primary toxins may include cobalt (and/or cobalt salts), nickel (and/or nickel salts), zirconium (and/or zirconium salts), molybdenum (and/or molybdenum salts), cadmium (and/or cadmium salts), bismuth (and/or bismuth salts), tin (and/or tin salts), antimony (and/or antimony salts), arsenic (and/or arsenic salts), and selenium (and/or selenium salts), and/or combinations thereof. According to one embodiment, the primary toxin is a copper salt. In a further embodiment, the primary toxin is basic copper carbonate. In still another embodiment, the primary toxin is copper sulfate.

The primary toxin is coated in a continuous phase in an amount sufficient to form the active components (e.g., the primary toxin) into a useful particle. In embodiments, the continuous phase is about 1-50% by weight of the total formulation.

The continuous phase may be a sold wax system. The wax may be, for example, one or more fatty acids. According to an embodiment, the wax is a long chain fatty acid such as palmitic acid, stearic acid, or mixtures thereof. Alternately, or additionally, the wax may be a natural wax such as beeswax, bayberry wax, candelilla was, carnauba wax, Japan (sumac) wax, lanolin, and/or rice bran. In still another embodiment, the wax is a natural ester such as one or more triglycerides, monoglycerides, and diglycerides. In a further embodiment, the continuous phase is a modified natural fat, such as a fatty alcohol, fatty amide, pentaerythritol ester, cetyl ester, polyglycerol ester, ethoxylated fatty alcohol, rosin ester, or mineral wax such as ceresin, kester wax, ozokerite wax, and/or montan wax. In still a further embodiment, the continuous phase is a petrochemical wax such as microcrystalline wax, paraffin or synthetic paraffin wax, polycyclopentadiene, silicone, and/or mixtures thereof.

The solubilizing agent forms about 1% to about 85% of the total weight of the second bead. In an embodiment, the solubilizing agent is about 1% to about 50% of the total weight of the formulation, or about 1% to 30% by weight of the formulation. In still a further embodiment, the solubilizing agent is about 1% to about 20% of the formulation by weight.

The solubilizing agent may be selected from chemical groups such as carboxylic acids, amines, inorganic acids, or ammonium salts. The solubilizing agent may be a chelating agent, or a sequestering agent. According to one embodiment, the solubilizing agent is a carboxylic acid. In an embodiment, the carboxylic acid is an aliphatic carboxylic acid, and may be, for example, acetic acid, ascorbic acid, citric acid, fumaric acid, glycolic acid, gluconic acid, glucuronic acid, lactic acid, malic acid, oxalic acid, tartaric acid, uric acid, and/or mixtures thereof. According to still another embodiment, the solubilizing agent is a short chain fatty acid, such as acetic acid. In further embodiments, the solubilizing agent is an aromatic carboxylic acid, such as benzoic acid, salicylic acid, or acetylsalicylic acid, and/or mixtures thereof.

According to another embodiment of the invention, the solubilizing agent is an amine, such as the amino acid lysine.

According to yet another embodiment, the solubilizing agent is an inorganic acid. The inorganic acid may be, for example, hydrochloric acid, sulfuric acid, phosphoric acid, nitric acid, boric acid, hydrofluoric acid, hydrobromic perchlorate, hydroiodic acid, ferric chloride, or any of the acids' partial salts and/or combinations thereof. In one embodiment, the solubilizing material is sodium dithionite (i.e., sodium hydrosulfite) or sodium bisulfite, or combinations thereof.

In still a further embodiment, the solubilizing agent is an ammonium salt, such as sulfate, chloride, nitrate, nitrite, acetate, bicarbonate, fluoride, bromide, iodide, bisulfide, carbonate, lactate, phosphate, citrate, and/or mixtures thereof.

According to still another embodiment of the invention, the solubilizing agent is a chelating agent, such as ethylenediaminetetraacetic acid, tartaric acid, oxalic acid, malonic acid, succinic acid, adipic acid, pimelic acid, azelaic acid, sebacic gluconic acid, fumaric acid, and aspartic acid. In a further embodiment, the solubilizing agent is an amino acid such as alanine, arginine, asparagine, cysteine, glutamic acid, glutamine, glycinol, histidine, hydroxyproline, isoleucine, leucine, lysine, methionine, phenylalanine, proline, pyroglutamic acid, serine, threonine, tryptophan, tyrosine, valine, and/or total or partial salts of the amino acids, or lactone, or esters, and/or mixtures thereof.

According to an embodiment, the solubilizing agent is lysine. According to another embodiment, the solubilizing agent is glucono-delta-lactone (GDL).

In one embodiment, the formulation of the second bead further includes a continuous phase in an amount sufficient to form the active components (e.g., the solubilizing agent) into a useful particle. In embodiments, the continuous phase is about 1-50% by weight of the total formulation.

As noted above, the continuous phase may be a sold wax system. The wax may be, for example, one or more fatty acids. According to an embodiment, the wax is a long chain fatty acid such as palmitic acid, stearic acid, or mixtures thereof. Alternately, or additionally, the wax may be a natural wax such as beeswax, bayberry wax, candelilla was, carnauba wax, Japan (sumac) wax, lanolin, and/or rice bran. In still another embodiment, the wax is a natural ester such as one or more triglycerides, monoglycerides, and diglycerides. In a further embodiment, the continuous phase is a modified natural fat, such as a fatty alcohol, fatty amide, pentaerythritol ester, cetyl ester, polyglycerol ester, ethoxylated fatty alcohol, rosin ester, or mineral wax such as ceresin, kester wax, ozokerite wax, and/or montan wax. In still a further embodiment, the continuous phase is a petrochemical wax such as microcrystalline wax, paraffin or synthetic paraffin wax, polycyclopentadiene, silicone, and/or mixtures thereof.

In still another embodiment, the formulation optionally further includes a bait. The bait can be, for example, corn meal, formulated fish food, algae or grass fragments. The bait may be selected based on preferred feed for certain target species. The bait may make up between approximately 0% to approximately 50% by weight of the total formulation.

For filter feeding fish, such as big head carp and silver carp, the formulation may be fed to the fish as separate particles (e.g., the first bead comprising the primary toxin coated in a continuous phase (the "toxin bead"), and the second bead comprising the solubilizing agent coated in a continuous phase (the "solubilizing bead"), and optionally the bait). For non-filter feeding fish, however, the toxin bead, the solubilizing bead, and optionally the bait may be combined with a gelling agent to form a slurry for the purpose of forming specie-specific particles. The gelling agent can be, for example, gelatin or sodium alginate (or other similar polysaccharides). The toxin bead, the solubilizing bead, and the bait are mixed in with the gelling agent to form a slurry. The slurry is then molded into a specie-specific pellets and subsequently gelled according to the gelling agent. For example, if the gelling agent is sodium alginate, the pellets may be cross-linked with a multivalent ionic compound such as calcium chloride. If the gelling agent is gelatin, the pellets may be headed to the gelling temperature. Thus, the pellet can be made more attractive to a species of non filter-feeding fish.

FIG. 1 illustrates the process for forming pellets. The ground powder 100 represents a toxin prior to the coating process. Coating the powder 100 (e.g., via spray congealing) results in small toxic beads 105. The toxic beads are then combined with the bait composition, and molded to form the dried pellets 110.

The size and configuration of the final pellet may be dictated by the target species of fish. For example, bighead and silver carp may prefer a particle size ranging from approximately 50 to 200 microns, and therefore the respective toxin bead and solubilizing bead may be formed according to such preferences. For the bigheaded carps, which eat beads ranging in size from approximately 50 microns to 1 millimeter, by making the beads around 150 microns, non-target juvenile fish are excluded and damage to, for example, paddlefish (which generally consume 800 plus micron particles) is limited. Grass carp, on the other hand, prefer (though not necessarily exclusively) food which is configured as a rod that is several centimeters long, or longer (e.g., a meter or longer), and approximately 0.2 cm in diameter. For common carp, a pellet is the preferred food. Various embodiments may include a bead size and/or pellet size selected such that targeted fish species that would ingest the piscicide, including bighead and silver carp.

The formulation is safe to handle since only the fat and bait are touched by humans. In the water, if not consumed after about a day, the formulation will sink, degrade and become part of the sediment. If the beads are used to remove filter feeding fish, the primary toxin bead will continue to float and can be netted and removed from the environment. There is limited if any downstream spread of the formulation.

EXPERIMENTS

Background

The formulations were tested on Koi held in aquatic tanks using municipal water. Before use, the water was filtered using activated carbon, treated with a water conditioner, and allowed to age at least overnight to remove ammonia, chloramines and chlorine. Five to twelve disease-free fish were placed in each of the ~12 gallon filtered and aerated tanks. Control samples of food were provided, and the fish were allowed acclimate to eating the control food sample.

The temperature, pH, copper ion content, and ammonia content of the water was tested daily and recorded. Alkalinity and calcium were checked intermittently. All chemical tests were API aquarium test kits. The pH was adjusted to pH 7.0 to 7.5 using water changes. The experiments were completed in a non-temperature controlled building. However, the water temperature was maintained at approximately 70 degrees F. with about a 5-degree variance. During the testing period, approximately 20% of the water was replaced daily.

The amount of food the fish in a tank consumed was estimated from the fecal material and uneaten pellets. The tanks were arranged in a line from Tank 1 to Tank 9. Tank 1 was farthest from the light and nearest an inside wall. These fish ate less. Tank 9 was closest to the light and an outside wall. Tank 9 had the most temperature variation between day and night. Tank 5 was the control, and those fish received pellets consisting of Corbion Pationic™ 909 glycerol mono stearate, bait and sodium alginate.

Once the fish were acclimated, they fasted for 48 hours. The control fish were fed control pellets and they consumed approximately 90% of the pellets during each 24-hour period. The control fish throughout the test appeared healthy and plump.

The fish in the other tanks were fed formulations of toxic pellets as described below. Several continuous phases were considered, including glycerol monostearate, glycerol tristearate, stearic acid, palmitic acid, lauric acid, beeswax, sodium alginate, and gelatin. Each of these continuous phases are FDA approved food ingredients, and are EPA listed pesticides or approved inert ingredients.

In addition to experimenting with continuous phases, several active ingredients were considered, including $CuSO_4$, $CuCO_3OH$, GDL (glucono-delta-lactone), $NH_4SO_4$, sodium diacetate, aspirin ($C_9H_8O_4$), $NaHSO_4$, CaO, $CaCl_2$, Xanthan gum, sodium acetate, and coated aluminum beads. The highly soluble active ingredients (e.g., $CuSO_4$, $NH_4SO_4$, $NaHSO_4$, CaO, $CaCl_2$, and sodium acetate) leaked toxin or solubilizing agent. Additionally, highly reactive materials (e.g., $NaHSO_4$, and CaO) reacted with the coating materials.

FIG. 2 is a chart showing estimated percentage of consumption (based on fecal material and number of unconsumed pellets) of various formulations of toxic pellets over 24 hours for several days. Unsurprisingly, it was confirmed that fish do not consume formulations that include copper as well as the control formulation. However, it was also confirmed that the fish consumed formulations of toxins that were not prone to leakage (e.g., containing copper carbonate) better than formulations containing water soluble copper sulfate.

Various formulations containing copper carbonate were tested. FIG. 3 is a chart showing estimate percentage of consumption (based on fecal material and number of consumed pellets) of various formulations of toxic pellets containing copper carbonate over 24 hours for several days. In FIG. 3, it can be seen that consumption of the toxic pellets was generally the same as the control pellets on day 1, and then eventually tapers off.

Interestingly, the color of the pellet impacts the likelihood of the fish consuming the pellet. Basic copper carbonate has a green color, while water soluble copper sulfate is blue. Generally, it was found that fish responded better to pellets having a green color rather than beads having a blueish color. In one embodiment, copper carbonate was mixed with a solubilizing agent and subsequently coated. Here, the solubilizing agent reacted with the copper carbonate causing the color change from green to a bluish color. Accordingly, two beads may be prepared—a first bead consisting of the toxin (here, copper carbonate) and a fat, and a second bead consisting of the solubilizing agent and a fat. The beads can then be mixed together to form a pellet which the fish would eat.

Copper Carbonate Pellet Formulation

In one method of formulating the toxic pellets for consumption, 250 grams of Acme Hardesty 98% palmitic acid was melted. 38 grams of Old Bridge basic copper carbonate, technical grade, (particle size 4 to 8 microns) was added to the molten palmitic acid and mixed. The slurry did not settle. The slurry was sprayed using a Glue Machinery's Champ™ 10s LCD Hot Spray Gun onto a Teflon® coated cookie sheet. Approximately 100 grams of light green beads were collected. The beads were 13.2% by weight and 3.3% by volume basic copper carbonate.

Approximately 5 grams of lysine, 14 grams corn meal, 13 grams of ground Koi pond food and 3.5 grams of FMC sodium alginate, Protanal RF 6650 were dry blended. The dry blend was added to 253 grams of distilled water and mixed until smooth with a stick mixer. The slurry was allowed to rest for 5 minutes. 31 grams of Balchem AminoShure®-L, encapsulated L-lysine monohydrochloride (45 to 53% lysine monohydrochloride, 47 to 55% proprietary lipids) and 30 grams of the above basic copper carbonate in palmitic acid beads were manually stirred into the sodium alginate slurry until consistent, about 30 seconds. A rubber mat with uniform, diamond-shaped holes, ~1 by 0.3 mm was sprayed on one side with a 5% calcium chloride solution and placed on a plastic surface sprayed with the 5% calcium chloride solution. The above sodium alginate slurry was placed on the mat and the excess squeegeed off (see FIG. 1). The mat, with holes filled with the sodium alginate slurry, was then placed in a 5% calcium chloride solution. The mat process was repeated with new mats until all the sodium alginate slurry was consumed. The mats in the calcium chloride were allowed to rest for 15 minutes, the calcium chloride solution, now pale light green but transparent, was drained. Water, at an approximate pH of 7 was put in the container with the mats and held for 10 minutes, the nearly clear solution drained. A second and third rinse were conducted as before and both drained solutions were clear. The mats were dried overnight. When dry, the diamond-shaped pellets were removed from the mat by crumbling them from the mat.

Comparison of Consumption of Control Versus Copper Carbonate Formulation

After fasting for 24 hours, the fish were fed. The control fish in the control tank received control pellets, and consumed approximately 90% of the pellets over 24-hours. Fish in two test tanks received the copper carbonate pellets. The fish fed the basic copper carbonate Balchem lysine pellets initially ate 90% of the food, and consumption subsequently dropped to under 20%.

Presence of copper in the ambient water was tested daily. It was negative in both the test and control tanks for 7 days. In the test tanks on day 8 copper was detectable but below the test limit. On day nine of the test tanks, the copper reading was 0.25 ppm. The timing of these analytical results suggests successful piscicide performance.

In addition, the fecal material of the fish in the test tanks as compared to the control tank was analyzed. In the control tank, the fecal material consistently appeared white. On the other hand, the fecal material of the fish fed copper was aqua, brown green, or other shades of green. The control fish consistently appeared healthy; however, after 6 days all fish fed copper formulations were emaciated.

Mortality

In one test tank, two fish died on the fourth day, one with a white abdomen the other with a yellow green spot on the abdomen. In the other test tank, two fish died on day four both with yellow green spots on their bellies. The average mortality of the two tanks was 22.5%. Upon dissection, 68% of the fish had died with a yellow green abdomen or had indication of yellow green abdomen or green fluid in the fish cavity.

Consistent with the observed fecal matter, dissection of the control fish demonstrated intestines full of white material. In contrast the fish receiving the had empty intestines or intestines with dark green to black fecal matter. Almost all copper fed fish appeared to have enlarged liver/head kidneys that were dark green/black. At least half of the fish that died from copper containing formulations had a yellow to dark green spot on the fish's abdomen near one of the pectoral fins. Dissection of the fish with the colored bellies demonstrated green fluid and/or an enlarged liver/head kidney and/or gall bladder.

Additional Toxin Formulation Experiments

Table 1, below, illustrates the results of several experiments conducted using various toxins and solubilizing agents. Experiment 29 (29.1 and 29.2, representing the same experiment in two different tanks of fish) demonstrated that basic copper carbonate alone is unlikely to kill fish even after a prolonged period of at least eight days. The fish continued to eat during the duration of the test at reduced rate versus the control, but at a significantly higher than other toxic formulations. Formulations containing a solubilizing agent, e.g., experiment 24 (24.1 and 24.2) (lysine), experiment 26 (26.1 and 26.2) (GDL), experiment 35 (35.1 and 35.2) (acetylsalicylic acid), experiment 38 (38.1 and 38.2) (sodium diacetate)—all killed fish. Formulations containing agents that solubilize the copper in the pellet and/or bead are not well consumed by the fish, such as shown in experiment 30 (30.1 and 30.2) (Lauric acid) and experiment 33 (33.1 and 33.2) (amine oxide). Formulations containing solubilizing agents that do not solubilize copper at all did not kill the fish as shown in experiment 28 (28.1 and 28.2) (Acetaminophen). Therefore, it was shown that the timing of the interaction between the solubilizing agent and the copper is important.

Interestingly, coated acetylsalicylic acid, experiment 31 (31.1 and 31.2) did not kill fish, while the uncoated, slightly water soluble acetylsalicylic acid, in the pellet did kill the fish, as shown in experiment 35 (35.1 and 35.2). Unlike lauric acid or amine oxide, acetylsalicylic acid did not leach out the basic copper carbonate from the coated bead.

Experiments 47 and 51 demonstrated that commercially sprayed samples improved the formulation toxicity. Experiments 48 and 52 showed that toxicity may occur if the basic copper carbonate and lysine beads are in separate pellets.

In experiments 39 and 43, the Koi were killed even with minimal consumption (20% consumption of the pellets on the first day). This suggests that the consumption increases for palmitic-coated formulations containing water insoluble basic copper carbonate as compared to highly impervious beeswax-coated formulations containing water soluble copper carbonate.

| # | Active Ingredient | Fish; Sample Color | Wt. % Active in fat | Wt. % Active in pellet | Solubilizing (Syn.) Ingredient | Wt. % Syn. in Fat | Wt. % Syn. in Pellet | Wax | Tests Results |
|---|---|---|---|---|---|---|---|---|---|
| 1 | Corbion Pationic 909 glycerol mono stearate, | Adult bighead carp; White bead | 100.0% | 100.0% | None | | | Pationic 909 | Consumed but no mortality |
| 2 | Silberline Silbercote PC 1291X, Al Beads | Juvenile bighead carp; Silver bead | 100.0% | | None | | | None | Consumed but no mortality |
| 3 | Ca Chloride | Juvenile bighead carp; White bead | | 25.0% | None | | | Fully Hydrogenated Palm Oil | Consumed but no mortality |
| 4 | Sodium Acetate | Juvenile bighead carp; White bead | | 25.0% | None | | | Fully Hydrogenated Palm Oil | Consumed but no mortality |
| 5 | Xanthan gum | Juvenile bighead carp; White bead | | 25.0% | None | | | Fully Hydrogenated Palm Oil | Consumed but no mortality |

-continued

| # | Active Ingredient | Fish; Sample Color | Wt. % Active in fat | Wt. % Active in pellet | Solubilizing (Syn.) Ingredient | Wt. % Syn. in Fat | Wt. % Syn. in Pellet | Wax | Tests Results |
|---|---|---|---|---|---|---|---|---|---|
| 6 | Cu Sulfate, 5 hydrate | Juvenile Koi; blue pellet | 33.2% | 3.1% | GDL | 33.5% | 11.2% | 42% mono Fully Hydrogenated Soybean Oil GMS | One koi dies in 5 hours, the second overnight - conclusion that fish die from inhalation leakage from wax |
| 7 | Cu Sulfate, 5 hydrate | Juvenile Koi; Blue pellet | 33.2% | 3.1% | GDL/ NH4SO4 | 34.7% | 10.3% | 42% mono Fully Hydrogenated Soybean Oil GMS | 2 fish die at feeding, 3rd overnight - conclusion that fish from inhalation leakage from wax |
| 8 | Cu Sulfate, 5 hydrate | Juvenile Koi; Blue pellet | 33.2% | 3.1% | NH4SO4 | 35.9% | 11.7% | 42% mono Fully Hydrogenated Soybean Oil GMS | 2 fish die within 5 hours - conclusion that fish die from inhalation leakage from wax |
| 9 | Cu Sulfate 5 hydrate | Juvenile Koi; blue pellet | 1.9% | 1.3% | GDL/ NH4SO4 | 11.1% | 7.8% | 42% mono Fully Hydrogenated Soybean Oil GMS | Fish ate about 10%, 1/2 tanks filtered & water changed, 1/2 tanks no filtering and no water change - fish do not eat assume Cu leakage |
| 10 | Cu Sulfate, 5 hydrate | Juvenile Koi Blue pellet | 23.1% | 5.5% | GDL/ NH4SO4 | 23.1% | 5.5% | 42% mono Fully Hydrogenated Soybean Oil GMS | Fish did not eat, Test run for 72 hours, mortality 0 to 55% - fish do not eat assume Cu leakage |
| 11 | Cu Sulfate, 5 hydrate | Juvenile Koi separate Blue pellet | 4.0% | 0.8% | GDL/ NH4SO4 | 23.1% | 4.8% | 42% mono Fully Hydrogenated Soybean Oil GMS | Eating dropped from ~80% to ~20% from control to 2 days starving then poison; day 2 eating dropped to ~5%; fecal green): 6 tanks 3 filtered/~30% water change, 3 no water change or filter |
| 12 | Cu Carbonate, Basic | Juvenile Koi, Light green pellet | 2.4% | 1.7% | Lysine | 10.5% | 7.6% | Stearic Acid | Limited consumption; no mortality |
| 13 | Cu Carbonate, Basic | Juvenile Koi Royal Blue pellet | 3.6% | 2.6% | Lysine | 13.1% | 9.6% | 80%-42% mono GMS Fully Hydrogenated Soybean Oil GMS, 20% Palmitic Acid | Limited consumption; no mortality |
| 14 | Cu Carbonate, Basic | Juvenile Koi green blue pellet | 4.0% | 2.9% | Lysine | 17.5% | 13.0% | Palmitic Acid | Limited consumption; no mortality |
| 15 | Cu Sulfate, 5 hydrate | Juvenile Koi pellet light green | 2.4% | 1.7% | Lysine | 10.1% | 7.4% | Stearic Acid | ~50% consumed, green fecal, beads in water (fish spit out?) |
| 16 | Cu Carbonate Basic | Juvenile Koi pellet aqua | 3.8% | 2.8% | Lysine | 13.4% | 9.7% | 93% 42% mono Fully Hydrogenated Soybean Oil GMS, 7% Palmitic Acid | Limited consumption, green fecal; day 2 consumption appeared to end |
| 17 | Cu Carbonate, Basic | Juvenile Koi | 9.3% | 3.5% | CaO/ Lysine | 28.9% | 10.0% | Stearic Acid | 60% eaten over 4 days; white, brown, green & aqua fecal, 2 Fish dying 4th day |
| 18 | Cu Carbonate, Basic | Juvenile Koi, pellet green aqua | 9.3% | 3.4% | CaO/ Lysine | 32.8% | 13.0% | Stearic Acid | 50% consumed, aqua, green & brown fecal, 2 fish died day one |
| 19 | Cu Carbonate, Basic | Juvenile Koi; pellet light green | 9.3% | 3.4% | GDL | 23.1% | 8.5% | ~60% Stearic Acid/~40% 42% Mono Fully Hydrogenated Soybean Oil GMS | 50% consumed, green & brown fecal, lots of beads in water, no mortality |

-continued

| # | Active Ingredient | Fish; Sample Color | Wt. % Active in fat | Wt. % Active in pellet | Solubilizing (Syn.) Ingredient | Wt. % Syn. in Fat | Wt. % Syn. in Pellet | Wax | Tests Results |
|---|---|---|---|---|---|---|---|---|---|
| 20 | NaHSO3 | Juvenile Koi pellet yellow brown | 7.7% | 5.5% | Lysine | 15.4% | 11.1% | Stearic Acid | 65 to 70% eaten over 2 tanks, Initially fecal green, then white and brown, no mortality |
| 21 | Cu Carbonate, Basic | Juvenile Koi, pellet green aqua | 9.3% | 5.4% | Lysine | 0.0% | 35.0% | Stearic Acid | 63% eaten over 4 days, fish died on day one, Brown/green & aqua fecal, lots of beads in water |
| 22 | CaO | Juvenile Koi, pellet yellow brown | 10.1% | 3.6% | CaO | 25.8% | 9.5% | Stearic Acid | 65% eaten over 4 days, white fecal & lots of beads, one fish died on day 1 |
| 23 | CaO | Juvenile Koi pellet yellow brown | 10.1% | 3.6% | CaO | 32.5% | 12.0% | 50% Stearic Acid/50% 42% Mono Fully Hydrogenated Soybean Oil GMS | 65% eaten over 4 days, white fecal & lots of beads; no mortality |
| 24.1 | Cu Carbonate, Basic | Juvenile Koi pellet aqua | 15.3% | 7.6% | Lysine | | 33.6% | 85% Palmitic Acid/15% Stearic Acids | Day one ate 60% dropping to 30% days 2 & 3 then to 0 to 5% with pellets untouched, Day 6 fish died, green spot on outside, intestines empty, liver looked 2 to 4X larger |
| 25.1 | Cu Carbonate, Basic | Juvenile Koi pellet aqua | 12.3% | 6.0% | GDL/ 2% uncoated Lysine | 13.9% | 6.8% | 85% Palmitic Acid/15% Stearic Acids | 40% eating day one, dropping to 10 to 30% between days 2 & 7 - average 18% eaten over 5 days; no mortality |
| 26.1 | Cu Carbonate, Basic | Juvenile Koi pellet brown green | 12.3% | 6.0% | GDL | 13.9% | 6.8% | 75% Palmitic Acid/25% Stearic Acids | 55% eating first two days dropping to 10 to 30% between days 3 & 7, fish died on day 8, scales missing (feed control day 7), 32% eaten over 5 days |
| 24.2 | Cu Carbonate, Basic | Juvenile Koi, pellet aqua | 15.3% | 7.6% | Lysine | | 33.6% | 85% Palmitic Acid/15% Stearic Acids | Day 1 & 2 ate 60%, dropped to 35% days 3-5 then 0%, 38 % eaten over 5 days - Fish died day 6, yellow green abdomen |
| 26.2 | Cu Carbonate, Basic | Juvenile Koi, pellet brown green | 12.3% | 6.0% | GDL | 13.9% | 6.8% | 75% Palmitic Acid/25% Stearic Acids | Ate 50% day one then dropped to 5 to 20% days 2 to 7, 14% eaten over 5 days - fish died on day 8 yellow abdomen bottom, dissection intestines appeared empty, liver/head kidney extremely large |
| 25.2 | Cu Carbonate, Basic | Juvenile Koi, pellet aqua | 12.3% | 6.0% | GDL/2% uncoated lysine | 13.9% | 6.8% | 85% Palmitic Acid/15% Stearic Acids | Ate 70% day 1, dropping to 40% days 2 & 3 then 10% that day 7, 32% eaten over 5 days; no morality |
| 27.1 | Acetaminophen | Juvenile Koi, pellet Cream | 12.3% | 8.5% | None/2% uncoated lysine | | | Palmitic Acid | Ate 50+% of pellets by fecal, no uneaten pellets; rest either spit out pellets or unformed fecal, no mortality |
| 28.1 | Cu Carbonate, Basic/ Acetaminophen | Juvenile Koi pellet Light White green | 12.3% | 4.3% | Acetaminophen 2% uncoated lysine | 13.2% | 4.5% | Palmitic Acid | Appeared ate most particles for 72 hours then started to spit out from fecal, no mortality |
| 29.1 | Cu Carbonate, Basic | Juvenile Koi, pellet Brown green | 13.2% | 9.3% | None/2% uncoated lysine | | | Palmitic Acid | Ate about 30 to 70% of pellets each day, rest looked like spit out, beads rejected, fecal mostly aqua, more beads in water as test continued, no mortality |

-continued

| # | Active Ingredient | Fish; Sample Color | Wt. % Active in fat | Wt. % Active in pellet | Solubilizing (Syn.) Ingredient | Wt. % Syn. in Fat | Wt. % Syn. in Pellet | Wax | Tests Results |
|---|---|---|---|---|---|---|---|---|---|
| 30.1 | Cu Carbonate, Basic | Juvenile Koi, pellet aqua | 13.2% | 9.2% | Lauric Acid/2% uncoated lysine | 26.5% | 4.2% | Palmitic Acid/ Lauric Acid | Consumption limited to maybe 20% for first 2 days then dropped to 5 to 10%, 70% increasing to 90% pellets uneaten, no mortality |
| 27.2 | Acetaminophen | Juvenile Koi, pellet Cream | 12.3% | 8.5% | None/2% uncoated lysine | | | Palmitic Acid | Ate 90% pellets for 3 days then dropped to 50 to 80%, no uneaten pellets, no mortality, water turned yellow on day 11 |
| 28.2 | Acetaminophen/Cu Carbonate, Basic | Juvenile Koi, pellet Light White green | 12.3% | 4.3% | uncoated lysine | 13.2% | 4.5% | Palmitic Acid | Days 1 to 3 ate 60 to 90% then dropped to 5 to 35%, aqua green or dark fecal, after 8 days 70 to 80% pellets uneaten or spit out, no mortality |
| 29.2 | Cu Carbonate, Basic | Juvenile Koi, pellet Brown green | 13.2% | 9.3% | None/2% uncoated lysine | | | Palmitic Acid | Days 1 to 3 ate 20, then 70% followed by 60%, did not feed day 4, ate 50% day 5 & 6 then dropped to 5-10% with ~80% uneaten pellets, aqua or Dark green fecal, no mortality |
| 30.2 | Cu Carbonate, Basic | Juvenile Koi pellet aqua | 13.2% | 9.2% | None/2% uncoated lysine | 26.5% | 4.2% | Palmitic Acid/Lauric Acid | Ate 30% day one, then dropped to 5 to 10%, most days 80% uneaten pellets, day 6 one fish died, with green abdomen; fecal aqua, or dark green, or clear |
| 31.1 | Cu Carbonate, Basic | Juvenile Koi; Light Green pellet | 14.0% | 4.9% | Aspirin/2% uncoated lysine | 14.9% | 5.2% | Palmitic Acid | Ate 90% day 1 then dropped to 35% days 2 & 3 then to under 5% out to day 10; Uneaten pellets went from 0 to 40% to 90%; fecal aqua, no mortality |
| 32.1 | Cu Carbonate, Basic | Juvenile Koi; Light Green pellet | 14.0% | 5.0% | Na Diacetate/ 2% uncoated lysine | 14.5% | 5.0% | Palmitic Acid | Ate 80% day 1 then dropped to 50% days 2 & 3 then to 20% days 4 & 5 then to under 5% out to day 10; Uneaten pellets went from 0 to 0% to 65% to 90%; fecal aqua, no mortality |
| 33.1 | Cu Carbonate, Basic | Juvenile Koi; Aqua pellet | 14.0% | 7.8% | Amine Oxide, 2% uncoated lysine | 16.1% | 16.1% | Palmitic Acid | Fish ate less than 5% of pellets; 90% uneaten pellets, no mortality, experiment ended at 5 days, fecal aqua |
| 34.1 | Cu Carbonate, Basic | Juvenile Koi; Grey pellet | 14.0% | 5.7% | Silberline Silbercote PC 1291X, Al Beads, 2% uncoated lysine | 27.2% | 28.2% | Palmitic Acid | Ate 60% of pellets first 4 days then dropped to 25% followed by under 5%. Silver fecal, uneaten pellets went from 0 to 80%, green fecal, no mortality |
| 31.2 | Cu Carbonate, Basic | Juvenile Koi; Light Green pellet | 14.0% | 4.9% | Aspirin/ 2% uncoated lysine | 14.9% | 5.2% | Palmitic Acid | Day 1 & 2 ate 80% then 60% day 3 with no uneaten pellets; day 4 to 10 consumption dropped to under 10%, with generally 90% uneaten pellets, fecal aqua & green; no mortality |
| 32.2 | Cu Carbonate, Basic | Juvenile Koi; Light Green pellet | 14.0% | 5.0% | Na Diacetate/ 2% uncoated lysine | 14.5% | 5.0% | Palmitic Acid | 80% E day 1 dropped to 25% days 2-4 then under 10%, uneaten pellets went from 5% to 55% to 95%. aqua & Dark green |

-continued

| # | Active Ingredient | Fish; Sample Color | Wt. % Active in fat | Wt. % Active in pellet | Solubilizing (Syn.) Ingredient | Wt. % Syn. in Fat | Wt. % Syn. in Pellet | Wax | Tests Results |
|---|---|---|---|---|---|---|---|---|---|
| 33.2 | Cu Carbonate, Basic | Juvenile Koi; Aqua pellet | 14.0% | 7.8% | Amine Oxide/2% uncoated lysine | 16.1% | 16.1% | Palmitic Acid | fecal, fish died days 6 & 8, mortality 25% Ate 10% first day then dropped to under 5%, ended test day 4, no mortality, if fecal aqua, uneaten pellets from 85% to 95% |
| 34.2 | Cu Carbonate, Basic | Juvenile Koi; Grey pellet | 14.0% | 5.7% | Silberline Silbercote PC 1291X, Al Beads, 2% uncoated lysine | 27.2% | 28.2% | Palmitic Acid | Ate 60% of pellets first 3 days then dropped to 30% followed by under 5%. Silver fecal, appears fish put pellets in mouth and spit out days 3 to 7, uneaten pellets went from 0 to 70%, green fecal, sometimes a dark green fecal, no mortality |
| 35.1 | Cu Carbonate, Basic | Juvenile Koi; Light Green pellet | 14.0% | 7.2% | Uncoated aspirin/ 2% uncoated lysine | none | 20.8% | Palmitic Acid | 80% E day 1, 10% day 2, 60% day 3 then drop to under 10% with 80+% pellets uneaten, aqua fecal, fish died days 8, 9 10 & 11, white abdomen but kidney/liver looked big, 50% mortality |
| 35.2 | Cu Carbonate, Basic | Juvenile Koi; Light Green pellet | 14.0% | 7.2% | Uncoated aspirin, 2% uncoated lysine | none | 20.8% | Palmitic Acid | 50% day 1 then feeding declined to under 5%, aqua F, Fish died days 9, 11 & 13. Only last fish had green abdomen, 50% mortality |
| 36.1 | Cu Carbonate, Basic | Juvenile; Light Green pellet | 13.7% | 5.5% | Na Di acetate, 2% uncoated lysine, silica gel | 24.2% | 3.3% | Palmitic Acid | 90% eaten day 1 dropped to 40% day 2, 15% day three to under 10% days 4 to 8, uneaten pellets went from 9 to 50%, to 80% to 95%. fecal aqua or clear, no mortality |
| 37.1 | Cu Carbonate, Basic | Juvenile Koi; Light green pellet | 13.7% | 5.6% | Na Diacetate/ 2% uncoated lysine, corn starch | 14.5% | 1.9% | Palmitic Acid/ | 90% eaten day one, 55% days 2 & 3, ~20% to day 7, 5% day 8, Uneaten pellets increased from 0% to 5% days 2-4 then 65% after, mostly aqua fecal, some clear & dark green, no mortality |
| 38.1 | Cu Carbonate, Basic | Juvenile Koi; Light green pellet | 13.7% | 5.5% | Na Diacetate/ 2% uncoated lysine | 24.2% | 4.6% | Palmitic Acid | 90% eaten day one followed by 15% days 2-6, then under 5%; uneaten pellets 0% day 1, 5% day 2, ~90% days 3-8; fish died day 3, white abdomen; fecal aqua or green, mortality 17% |
| 36.2 | Cu Carbonate, Basic | Juvenile Koi: Light Green pellet | 13.7% | 5.5% | Na Diacetate/ 2% uncoated lysine, silica gel | 24.2% | 3.3% | Palmitic Acid | 90% eaten day 1, 60% day 2, 5% or less days 3-8; uneaten pellets 0% days 1 & 2, then ~80% days 3-8; fecal mostly aqua but some clear, white or dark green, fish died days 3 and 5, white bellies, mortality 29% |
| 37.2 | Cu Carbonate, Basic | Juvenile Koi: Light Green pellet | 13.7% | 5.6% | Na Diacetate/ 2% uncoated lysine, corn starch | 14.5% | 1.9% | Palmitic Acid | 90% eaten day 1, 65% days 2 & 3, then ~25% days to day 6 to ~10% day 8; uneaten pellets 30% day 4 green owing to 90% day 7, fecal mostly aqua, white, clear or dark green, no mortality |

| # | Active Ingredient | Fish; Sample Color | Wt. % Active in fat | Wt. % Active in pellet | Solubilizing (Syn.) Ingredient | Wt. % Syn. in Fat | Wt. % Syn. in Pellet | Wax | Tests Results |
|---|---|---|---|---|---|---|---|---|---|
| 38.2 | Cu Carbonate, Basic | Juvenile Koi: Light Green pellet | 13.7% | 5.5% | Na Diacetate/ 22% uncoated lysine | 24.2% | 4.6% | Palmitic Acid | Ate 80% day 1 then dropped to 60% day 2 then to 10% days 3 to 8; Uneaten pellets 60% day 8 (hottest tank may have degraded); fecal mostly aqua, some clear, white and dark green; fish died day 7 white abdomen; 14% mortality |
| 39 | Cu Sulfate, 5 hydrate | Juvenile Koi; Royal Blue pellet | 14.0% | 7.6% | None | none | None | Beeswax | Ate maybe 20% on day 1 limited fecal to day 5, day 9-11 5 out 7 fish died 3 W abdomen, 2 Y/Gr Abdomen, 2 of W abdomen fish had red/black ball in fish; Day 5 water tested positive for Cu and increased from + to .025; ammonia positive (higher than control) 71% mortality |
| 40 | Cu Carbonate, Basic; Na Ac | Juvenile Koi; Green pellet | 13.2% | 4.2% | Na Diacetate | 19.6% | 6.2% | Palmitic Acid | Ate most if not all food until day 5, some Green/Aqua Fecal, then stopped eating, Day 5 ammonia increased, Cu tested negative, no mortality |
| 41 | Cu Carbonate, Basic; Lauric/Na Ac | Juvenile Koi; Aqua pellet | 13.2% | 4.8% | Na Diacetate | 16.7% | 4.5% | Palmitic/Lauric Acids | Consumed all beads until day 10; Green/ Aqua/Brown Fecal throughout but decline after day 10 as consumption dropped to less than 10%, no ammonia or Cu reading; no morality |
| 42 | Cu Carbonate, Basic; Lauric | Juvenile Koi; Green pellet | 13.2% | 4.5% | Lauric Acid | 30.9% | 30.9% | Palmitic | Consumed all beads until day 10; Gr/Aq/Br F throughout but decline after day 10 as consumption dropped to less than 10%, no ammonia or Cu reading; no morality; |
| 43 | Cu Sulfate, 5 hydrate | Juvenile Koi; Aqua pellet | 14.0% | 7.6% | None | none | None | Beeswax | Ate small amounts initially then stopped eating by day 3; ammonia higher than control, Cu tested positive by day 3, no mortality |
| 44 | Cu Carbonate, Basic | Juvenile Koi; Green pellet | 13.2% | 4.2% | Na Diacetate | 19.6% | 6.2% | Palmitic Acid | Consumed all pellets until day 9, lots Gr/Aq/C F, detected Cu day 3 but below 0.25 ppm, ammonia positive day 2 to end; no mortality |
| 45 | Cu Carbonate, Basic | Juvenile Koi; Aqua pellet | 13.2% | 4.8% | Na Diacetate | 16.7% | 4.5% | Palmitic/Lauric Acids | Ate all pellets until day 9, ammonia not an issue, detectable but not measurable Cu, no mortality |
| 46 | Cu Carbonate, Basic | Juvenile Koi; Green pellet | 13.2% | 4.5% | Lauric Acid | 30.9% | 30.9% | Palmitic | Consumed all pellets until day 10, ammonia not an issue, Cu detectable day 3 but not measurable, mortality 12.5% |
| 47 | Cu Carbonate, Basic | Juvenile Koi; Green pellet | 13.2% | 4.1% | BalChem AminoShure-L, 49% Lysine | 49.0% | 15.7% | Palmitic/GTS? | Ate all pellets until day 3 then dropped by at least 50% to 90+% day 5; NH3 day 2 to end 0.2 to 0.5, Cu deterred day 3, grew |

-continued

| # | Active Ingredient | Fish; Sample Color | Wt. % Active in fat | Wt. % Active in pellet | Solubilizing (Syn.) Ingredient | Wt. % Syn. in Fat | Wt. % Syn. in Pellet | Wax | Tests Results |
|---|---|---|---|---|---|---|---|---|---|
| 48 | Cu Carbonate, Basic | Juvenile Koi; Green pellet | 13.2% | 9.3% | BalChem AminoShure-L, 49% Lysine | 49.0% | 31.0% | Palmitic/GTS | to 0.25 to end; mortality 25% All pellets eaten to day 5, day 6 Cu pellets uneaten which increased to 90+% uneaten pellets by day 8; NH3 0.25 on day 2 which increased to as high as 1 to end, Day 4 Cu detectable to end, Day 5 Fish died, mortality 25% |
| 49 | BalChem AminoShure-L, 49% Lysine (Control) | Juvenile Koi; Tan pellet | 49.0% | 31.1% | None | | | GTS | All particles consumed, no mortality, No fecal but ammonia detected on day 2 and increased to 2 by end of experiment |
| 50 | Cu Carbonate, Basic/ Lysine | Juvenile Koi; Green pellet | 13.2% | 2.8% | BalChem AminoShure-L, 49% Lysine | 49.0% | 21.0% | Palmitic/GTS | All pellets eaten to day 3 then 60% day 4 and continued to end (eating some then little), NH3 on day 2 0.25 then up to 0.5 to end; Cu 0.25 day 3 to end, no mortality: |
| 51 | Cu Carbonate, Basic/ Lysine | Juvenile Koi; Green pellet | 13.2% | 4.1% | BalChem AminoShure-L, 49% Lysine | 49.0% | 15.7% | Palmitic/GTS | All pellets eaten to day 2, Day 3 to end dropped to 60 to 90% UEP, NH3 at 0.1 day 1 up to 0.5 at end Cu 0.25 day 3 to end: Day 4 dead fish W abdomen, Gr fluid in fish, 11% mortality |
| 52 | Cu Carbonate, Basic/ Lysine | Juvenile Koi; Green pellet | 13.2% | 9.3% | BalChem AminoShure-L, 49% Lysine | 49.0% | 31.0% | Palmitic/GTS | All pellets consumed until day 6 then dropped to ~50% UEP, NH3 0.i to 0.5 to end; Day 3 to end detectable to 0.25 Cu; Fish died Day 6, 11% mortality |
| 53 | BalChem AminoShure-L, 49% Lysine | Juvenile Koi; Tan | 49.0% | 31.1% | None | | | GTS | All particles consumed, no mortality, No fecal but ammonia detected on day 2 and increased to 2 by end of experiment |
| 54 | Cu Carbonate, Basic/ Lysine | Juvenile Koi; Green pellet | 13.2% | 5.5% | BalChem AminoShure-L, 49% Lysine | 49.0% | 10.3% | Palmitic/GTS | Ate all pellets until day 3 then dropped by at least 80% to 90+% UEP, NH3 day 1 0.1 varying between 0 and .25 to end; Cu detected day 2, grew to 0.25 to end; Fish died Day 5: mortality 37.5% |

Discussion of Results

Copper ions are absorbed by the fish's intestines, enter the blood stream and are transported to the liver and or head kidney for de-toxification. If there is too much copper, the fish's defensive mechanism cannot keep up and damage to the head kidney, liver, blood system and neural system occurs, followed by eventual death. In common carp, copper is stored in the liver where the fish tries to safely dispose of the copper. If copper overwhelms the liver, the cells grow in size and number before undergoing necrosis (cell death).

Fish that consumed soluble copper, or copper that became soluble in the digestive system, developed a yellow to green spot on the abdomen and or green fluid in the fish cavity. Therefore, it can be confirmed that the fish died from copper. All fish, including those that did not have yellow/green spots or green fluid exhibited "hyper" behavior after one day of consuming the copper containing pellets suggesting that the fish experience copper fish poisoning, ultimately leading to destruction of the liver. Lack of similar spots on control experiments or experiments with non-soluble copper support the conclusion.

Carp, like all fish, will not knowingly consume copper. Because carp are particularly selective eaters, Koi were used in the experiments for choosing food selectivity. Experiments 39 & 43 demonstrated that Koi will consume small amounts of pellets containing beeswax, a water insoluble, high molecular weight and non-ionic wax, and water-soluble copper sulfate beads. The Koi exhibited higher selectivity (i.e., lower consumption) toward pellets made with copper sulfate coated in stearic acid, palmitic acid, or glycerol monostearate. In contrast the Koi consumed substantially all pellets made with palmitic acid and water insoluble basic copper carbonate. The Koi's marginal consumption, yet high mortality, of beeswax/copper sulfate formulations demonstrated the high toxicity of soluble copper to fish.

Koi will readily consume pellets containing palmitic acid and basic copper carbonate beads. However, water insoluble basic copper carbonate is inefficiently absorbed in the fish's intestines as demonstrated by the lack of mortality after four days of 100% of pellet consumption (experiment 26.1 and 26.2). In general, Koi consumption drops once the soluble copper begins to react with the fish biology. Water-insoluble copper is presumably solubilized by a number of chemicals including inorganic acids, carboxylic acids, chelating agents and especially amines. Experiments 24 (24.1 and 24.2), 26 (26.1 and 26.2), 35 (35.1 and 35.2), 36 (36.1 and 36.2), and 38 (38.1 and 38.2) all demonstrate that fish toxicity of basic copper carbonate is increased by lysine, glucono-delta-lactone (GDL), acetylsalicylic acid (aspirin), and sodium diacetate, respectively.

Experiment 39 demonstrated that 100% soluble copper sulfate (1.9% as copper) coated in beeswax is quite toxic. Only 20% of the copper sulfate pellets were consumed on day 1. Yet 50% of the fish died by day 12. The amount of copper consumed is the key variable in the fish mortality.

Even with crystalline waxes like palmitic and or stearic acid, water soluble ingredients have limited shelf life in a fat encapsulation. It is believed that most highly water-soluble materials may only be protected by fat encapsulation for as little as a few minutes. For particles under 100-microns, in which the coating is very thin, it would therefore be somewhat difficult to protect water-soluble ingredients. Therefore, highly water-soluble materials like sodium di-acetate or copper sulfate may be less-preferred than other formulations.

By using nonpolymorphic waxes in combination with water insoluble or substantially water insoluble materials, the toxic components in the formulations do not disperse in the water column. The amount of pesticide is dramatically reduced versus water dispersible pesticides. The effect on non-target species is therefore narrowed to animals which consume pellets similar to the target fish and the toxic ingredient is not sensed by the fish. When GDL contacts any water, it slowly hydrolyzes to gluconic acid. Acetylsalicylic acid is only slightly water soluble. Separately, coatings for acetylsalicylic acid and basic copper carbonate are not toxic (experiment 31 (31.1 and 31.2) versus 35 (35.1 and 35.2)). It is believed that by the time the acetylsalicylic acid is soluble it does not have time to react with the basic copper carbonate and be absorbed by the fish. The increased toxicity of acetylsalicylic acid may be due to one of common carp's physiological reactions to copper poisoning, which is to increase the production of cortisol. It is known that acetylsalicylic acid is contraindicated with treatments of cortisol due to increased intestinal ulcers which can perforate and lead to death.

Carp are attracted to lysine (an amine) and amines are more reactive with copper than carboxylic acids. Lysine slowly dissolves in water. The fish readily consumed pellets made with lysine. The increased consumption led to increased ammonia readings and uptake of the copper as demonstrated by the fish exhaling ammonia and copper. Having the copper and lysine beads in separate pellets versus the same bead increased the consumption of pellets but delayed the toxicity of the formulation to the fish. Overall, toxicity was similar regardless of delivery method.

Sodium diacetate interacts with basic copper carbonate to solubilize the copper and make it toxic inside the fish. However, sodium diacetate is fat soluble meaning the fat does not completely coat the chemical. Since sodium diacetate is very water soluble the material leaches from the bead.

Although glucono-delta-lactone (GDL) did show toxicity with basic copper carbonate, the acid is likely to chelate versus sequester the copper. Chelating agents are a treatment for Wilson's disease (human accumulation of copper in the liver) and known to reduce copper toxicity to fish.

Other materials tested included acetaminophen, a registered EPA pesticide and FDA drug, as the toxic ingredient and as a solubilizing ingredient with basic copper carbonate. None of the Koi died in either test. Coated sodium bisulfate and calcium oxide (a strong acid and a strong base) did not kill Koi even though their fecal material was affected—sometimes turning green—and the pH of the water was affected.

A test with lauric acid and basic copper carbonate and amine oxide and basic copper carbonate demonstrated the fish would not eat the formulation. The lauric acid turned the green basic copper carbonate to an aqua. The amine oxide, a liquid, was mixed in the sodium alginate gel and penetrated the basic copper carbonate bead forming an aqua to royal blue pellet. It is believed that the insoluble copper became soluble. The fish detected the soluble copper and would not eat the material.

Once the fish learn that copper is in the formulation, the Koi will not eat, even to the point of starvation. The fish dramatically reduce their consumption after one or two days. Since liver or head kidney copper poisoning does not prevent respiration, the fish slowly dies or recovers. In the wild this is important because only one feeding may be needed to effectively damage the fish. Bigheaded carp have a high annual mortality. For example, studies of the silver carp in the Wabash River suggest the annual mortality is 44%. Therefore, by weakening the fish, the carp is more susceptible to environmental events.

Thus has been described various embodiments of piscicide compositions for reducing or eliminating nuisance fish species. By using the techniques described herein, and water insoluble or slowly soluble materials, fish are tricked into consuming materials that, with knowledge, they would not consume. The digestion process releases the primary toxin and solubilizing agent which then forms the active ingredient by making the toxin water soluble and absorbed through the fish's intestines. The maximum amount of primary toxin and synergistic agent in each encapsulated bead is determined by what the fish will consume Many different arrangements of the described invention are possible without departing from the spirit and scope of the present invention. Embodiments of the present invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the present invention.

Further, it will be understood that certain features and subcombinations are of utility and may be employed without reference to other features and subcombinations and are contemplated within the scope of the claims. Not all steps listed in the various figures and description need to be carried out in the specific order described. The description should not be restricted to the specific described embodiments.

The invention claimed is:

1. A piscicide composition, comprising: a first bead, comprising:
   about 0.5% to 75% by weight of a primary toxin;
   an effective amount of a continuous phase to form the primary toxin into a toxin bead;

a second head, comprising: about 1% to 85% by weight of a solubilizing agent; and an effective amount of a continuous phase to form the solubilizing agent into a solubilizing bead;

wherein the second bead does not include a toxin, wherein the primary toxin is selected from the list consisting of: copper salts, zinc salts, lead salts, mercury salts, and chromium salts, and mixtures thereof.

2. The piscicide composition of claim 1, wherein the toxin bead and the solubilizing bead are combined with a gelling agent to form a toxic formulation, and wherein the toxic formulation is subsequently formed into a pellet and cross-linked to form a toxic gelled pellet.

3. The piscicide composition of claim 2, wherein the gelling agent is one of sodium alginate and gelatin.

4. The piscicide composition of claim 2, further comprising an effective amount of a bait mixed into the toxic formulation.

5. The piscicide composition of claim 3, wherein the primary toxin is a copper salt selected from the list consisting of basic copper carbonate and copper sulfate.

6. The piscicide composition of claim 1, wherein the solubilizing agent is selected from the list consisting of: a carboxylic acid, an amine, a strong acid, and an ammonium salt.

7. The piscicide composition of claim 1, wherein the solubilizing agent is selected from the list consisting of: a carboxylic acid, an amine, a strong acid, and an ammonium salt.

8. The piscicide composition of claim 7, wherein the solubilizing agent is a carboxylic acid.

9. The piscicide composition of claim 7, wherein the solubilizing agent is lysine or glucono-delta-lactone.

10. The piscicide composition of claim 7, wherein the solubilizing agent is an inorganic acid.

11. The piscicide composition of claim 10, wherein the solubilizing agent is sodium hydrosulfite.

12. The piscicide composition of claim 7, wherein the solubilizing agent is an ammonium salt.

13. The piscicide composition of claim 7, wherein the continuous phase is a solid wax system selected from the list consisting of: fatty acids, natural waxes, natural esters, modified natural fats, mineral waxes, petrochemical waxes, and mixtures thereof.

14. The piscicide composition of claim 13, wherein the continuous phase is palmitic acid, stearic acid, beeswax, or mixtures thereof.

15. The piscicide composition of claim 1, wherein:
the first bead comprises:
about 1 to 55% by weight basic copper carbonate as the primary toxin; and
about 45-99% by weight palmitic acid as the continuous phase;
the second bead comprises:
about 5 to 50% lysine as the solubilizing agent; and
about 50 to 95% by weight glycerol tristearate as the continuous phase.

16. The piscicide composition of claim 1, wherein:
the first bead comprises:
about 1 to 55% by weight basic copper carbonate as the primary toxin; and
about 45-99% by weight palmitic acid as the continuous phase;
the second bead comprises:
about 5 to 80% glucono-delta-lactone as the solubilizing agent; and
about 20 to 95% by weight glycerol tristearate as the continuous phase.

17. The piscicide composition of claim 1, wherein the first bead comprises about 1 to 40% by weight copper sulfate as the primary toxin, and about 60 to 99% beeswax as the continuous phase.

18. The piscicide composition of claim 2, wherein the toxic gelled pellet is formed into a species dependent shape.

19. The piscicide composition of claim 18, wherein the toxic gelled pellet has a particle size of about 1 cm by about 0.5 cm.

* * * * *

UNITED STATES PATENT AND TRADEMARK OFFICE
CERTIFICATE OF CORRECTION

PATENT NO.        : 10,617,119 B1
APPLICATION NO.   : 16/248431
DATED             : April 14, 2020
INVENTOR(S)       : Maurice Sadowsky Page 1 of 1

It is certified that error appears in the above-identified patent and that said Letters Patent is hereby corrected as shown below:

In the Claims

In Claim 1 at Column 27, Line 1: "head" is replaced with --bead--

Signed and Sealed this
Ninth Day of June, 2020

Andrei Iancu
*Director of the United States Patent and Trademark Office*